United States Patent
Alphonse et al.

[11] 3,798,746
[45] Mar. 26, 1974

[54] PROCESS OF MAKING ACOUSTO-OPTIC DEVICES

[75] Inventors: Gerard Argant Alphonse, Hightstown; George Edward Bodeep, Wall Township, both of N.J.

[73] Assignee: RCA Corporation, New York, N.Y.

[22] Filed: Oct. 10, 1972

[21] Appl. No.: 295,975

[52] U.S. Cl............. 29/470.1, 29/472.7, 29/473.1, 29/594
[51] Int. Cl............................................ B23k 21/00
[58] Field of Search............ 29/472.9, 473.1, 470.1, 29/472.7, 594

[56] References Cited
UNITED STATES PATENTS

| | | | |
|---|---|---|---|
| 2,671,746 | 3/1954 | Brew | 29/470.1 UX |
| 2,709,147 | 5/1955 | Ziegler | 29/472.7 X |
| 2,957,236 | 10/1960 | Kreuchen | 29/470.1 |
| 3,131,459 | 5/1964 | Allen | 29/472.7 X |
| 3,247,473 | 4/1966 | Allen | 29/470.1 X |
| 3,590,467 | 7/1971 | Chase et al. | 29/504 X |

OTHER PUBLICATIONS

Larson, III, John D. et al., "Ultrasonically Welded Piezoelectric Transducers," IEEE Transactions on Sonics and Ultrasonics, July, 1971. pp. 142–152.

*Primary Examiner*—J. Spencer Overholser
*Assistant Examiner*—Ronald J. Shore
*Attorney, Agent, or Firm*—Glenn H. Bruestle; Birgit E. Morris

[57] ABSTRACT

Acousto-optic devices comprising a transducer bonded to an acousto-optic medium having improved bonds are made by a process whereby the surfaces to be joined are first roughened, a primer metal layer is coated onto the acousto-optic medium, which primer metal is the metal which is chemically bonded to oxygen in the acousto-optic medium, the primer layer is cooled, a layer of a conductive metal and a layer of indium are deposited onto both surfaces to be bonded and the indium layers pressed together in a vacuum.

5 Claims, 1 Drawing Figure

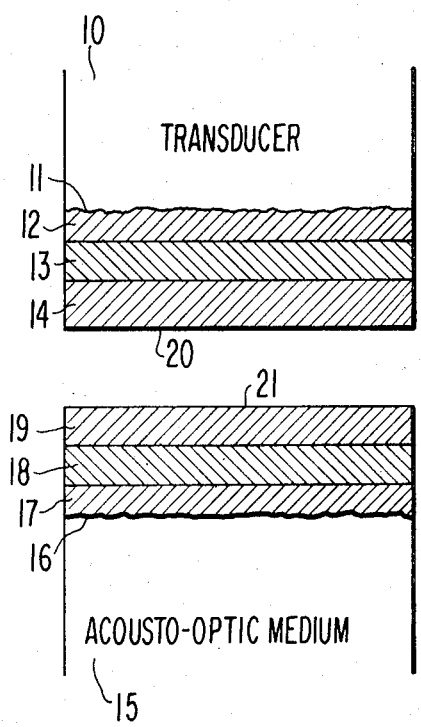

PROCESS OF MAKING ACOUSTO-OPTIC DEVICES

This invention relates to an improved process for bonding a transducer to an acousto-optic medium and to devices made by such process.

BACKGROUND OF THE INVENTION

Acousto-optic devices comprise an electrically driven piezoelectric transducer bonded to an acousto-optic medium. Such devices have applications as light deflectors in optical memories, acoustic delay lines, acoustic switches and the like. An acoustic strain wave modulates the refractive index of the medium which diffracts light in a preferred direction when light incident on the medium is near the Bragg angle and thus the medium acts as a grating, the grating period being equal to the wavelength of the sound in the medium.

Since the amount of sound which enters the acousto-optic medium depends in part on the quality of the bond between the transducer and the acousto-optic medium, the strength of the bond is important. The bonding materials used heretofore have included low melting inorganic solders, varnish, epoxy resins, silicone oils and greases. These bonding materials are mismatched acoustically to the acousto-optic medium, and, in order to prevent large losses, the bonding layer must be kept thin, e.g., a few thousand Angstroms or less. The mechanical strength of such thin bonding materials has been low, resulting in bond failure during lapping or handling.

Sittig and Cook, *Proceedings IEEE*, 56 p. 1375 et seq. (1968) disclose bonding of a sodium potassium niobate transducer to an acousto-optic medium by polishing and cleaning the surfaces to be joined, coating with a thin chromium layer as a metal primer layer, next coating with a thin gold layer and finally with a thin indium layer and pressing under several thousand psi at room temperature. However, this bond has insufficient mechanical strength to withstand the strains of lapping to reduce the size of the transducer. Heating at temperatures of about 200°–300°C. can improve the strength of the bond, but has an adverse effect on the properties of the acousto-optic medium. Thus an improved bond between a transducer and an acousto-optic medium would improve the performance of these devices.

SUMMARY OF THE INVENTION

We have found that the bond between the transducer and the acousto-optic medium can be improved by following certain process steps and utilizing certain metals as primer metals. According to the present process, the surfaces to be joined are, first, roughened slightly. The primer metal is the metal chemically bonded to oxygen in the acousto-optic medium and the primer metal layer is cooled prior to coating with a conductive layer.

BRIEF DESCRIPTION OF THE DRAWING

The FIGURE is a sectional view of an acoustic-optic device shown prior to pressing the surfaces to be joined together.

DETAILED DESCRIPTION OF THE INVENTION

The transducer and acousto-optic medium described herein are made of conventional materials and configuration. Transducers can be made of lithium niobate, sodium potassium niobate, lithium gallate, quartz, lead-titanium dioxide-zirconia ceramic and the like. Acousto-optic media include ferroelectric materials such as lead molybdate, lead tungstate, barium sodium molybdate, and other high refractive index materials such as telluride glass and the like.

In preparing the acousto-optic devices of the invention, the surface of the transducer and the acousto-optic medium to be bonded together are first roughened slightly. This improves the bond and prevents delamination during lapping. The surfaces are abraded using a conventional abrasive, such as finely divided alumina, diamond dust and the like. The roughened surface must be smooth to sound waves, but rough enough so that they will deflect light; undulations on the surface about one micron deep are satisfactory.

The surface of the acousto-optic medium is next coated with a thin layer of a primer metal, which is the metal chemically bonded to oxygen in the acousto-optic medium. For example, when a lead molybdate acousto-optic medium is employed, the primer metal is molybdenum; when a lead tungstate acousto-optic medium is employed, the primer metal is tungsten, and so forth. The primer metal coating is suitably from 200–500 A thick. Preferably, the primer metal coating can also be applied to the roughened surface of the transducer. The primer metal coatings can be conveniently applied by vapor deposition in a vacuum chamber.

The primer metal layer is next cooled to room temperature in an inert atmosphere. This step is important in order to form a bond of acceptable mechanical strength. Conveniently, the transducer is allowed to cool in the vacuum chamber employed for vapor deposition of the primer metal.

A thin layer of a conductive metal, for example, gold or silver, is next applied both to the transducer and to the acousto-optic medium over the primer metal. This layer is conveniently applied by vapor deposition in conventional manner until a layer of about 1,000–5,000 A in thickness is obtained.

A final layer of a room temperature-weldable metal, such as indium, is deposited on the conductive metal. This layer is also suitably from about 1,000–5,000 A thick.

The coated surfaces of the transducer and the acousto-optic medium are pressed together under pressure of about 2,000–10,000 psi, preferably 4,000–5,000 psi, in a vacuum at ambient temperatures whereby they are bonded together.

Referring now to the FIGURE, the transducer 10 has a roughened surface 11, a layer of primer metal 12, a layer of gold 13 and a layer of indium 14.

The acousto-optic medium 15 has a roughened surface 16, a layer of primer metal 17, a layer of gold 18, and a layer of indium 19. During formation of the device, the indium surfaces 20 and 21 are pressed together until a single indium layer is formed.

If desired, the transducer can be reduced in size or lapped to a thickness of about 15 microns without delaminating. Lapping can be accomplished by abrading or grinding the transducer with a suitable abrasive until the desired thickness is obtained.

A device suitable for an acousto-optic deflector was prepared as follows: a lead molybdate block and a lithium niobate transducer plate were abraded with diamond dust having an average particle size of about 6 microns to roughen the surfaces to be bonded. They were placed in a vacuum chamber which contained three boats filled with molybdenum, gold and indium, respectively, so that the roughened surfaces were facing the boats. The chamber was evacuated and heat applied to the molybdenum boat until a layer of molybdenum about 200 A thick had been deposited on the roughened surfaces of the block and transducer. After the molybdenum layer had cooled to room temperature, heat was applied to the gold boat until a layer of gold about 1,000 A thick had been deposited over the molybdenum layers. Heating of the gold boat was discontinued and a final layer of indium about 1,000 A thick was deposited over the gold layers in similar manner. While still in the vacuum chamber, the surfaces of the acousto-optic medium and the transducer coated as above were pressed together under about 4,000 psi for one-half hour. The resultant device was firmly bonded.

The acousto-optic device was completed by lapping the transducer to a thickness of about 15 microns. No delamination was noted.

The strength of the bond between the molybdenum layer and the acousto-optic medium can be demonstrated by the "Scotch tape test" whereby a piece of adhesive cellophane tape was pressed firmly onto the molybdenum and the tape pulled off quickly. No delamination or flaking of the molybdenum layer was noted.

As a comparison, a 200 A thick layer of chromium deposited on lead molybdate delaminated during Scotch tape testing.

We claim:

1. A method of preparing an acousto-optic device comprising a ferroelectric transducer bonded to an acousto-optic medium which comprises
   1. roughening the surfaces of said transducer and said acousto-optic medium to be bonded such that the surfaces diffract light waves but are smooth to sound waves,
   2. depositing a primer metal layer onto the surface of said acousto-optic medium to be bonded, which primer metal is the metal chemically bonded to oxygen in said acousto-optic medium,
   3. cooling said primer metal layer,
   4. depositing a conductive metal layer onto said primer layer and onto said roughened transducer surface to be bonded,
   5. depositing an indium layer on each of said conductive layers, and
   6. bonding said acousto-optic medium and said transducer by pressing said indium coated surfaces together in a vacuum at ambient temperature with from about 2,000–10,000 psi.

2. A method according to claim 1 wherein said acousto-optic medium is lead molybdate and said primer metal is molybdenum.

3. A method according to claim 2 wherein said molybdenum layer is from about 200–500 A thick, said conductive metal layers are from about 1,000–5,000 A thick and said indium layers are from about 1,000–5,000 A thick.

4. A method according to claim 3 wherein said conductive layer is gold.

5. A method according to claim 1 wherein said bonded transducer is lapped down to about 15 microns or less.

* * * * *